United States Patent [19]

Von Der Crone et al.

[11] 3,884,955

[45] May 20, 1975

[54] PROCESS FOR THE MANUFACTURE OF SUBSTITUTED O-CYANOBENZOIC ACID ESTERS

[75] Inventors: Jost Von Der Crone; Andre Pugin, both of Riehen, Switzerland

[73] Assignee: Ciba-Geigy Corporation, Ardsley, N.Y.

[22] Filed: Jan. 15, 1973

[21] Appl. No.: 323,686

[30] Foreign Application Priority Data
Jan. 17, 1972 Switzerland.......................... 617/72

[52] U.S. Cl.... 260/465 D; 260/283 CN; 260/294.9; 260/304; 260/307 D; 260/308 R; 260/309.2; 260/325; 260/332.2 A; 260/347.4
[51] Int. Cl.......................................... C07c 121/52
[58] Field of Search.................. 260/465 D

[56] References Cited
UNITED STATES PATENTS

| | | | |
|---|---|---|---|
| 3,029,277 | 4/1962 | Metivier.......................... | 260/465 X |
| 3,076,815 | 2/1963 | Pugin.............................. | 260/465 X |
| 3,576,882 | 4/1971 | Clark............................... | 260/465 X |
| 3,686,266 | 8/1972 | Gilch et al......................... | 260/465 |

OTHER PUBLICATIONS
Feist et al., Chemical Abstracts, Vol. 31, pp. 2185-2186, (1937).

*Primary Examiner*—Lewis Gotts
*Assistant Examiner*—Dolph H. Torrence
*Attorney, Agent, or Firm*—Vincent J. Cavalieri

[57] ABSTRACT
Substituted o-cyanobenzoic acid esters of the formula

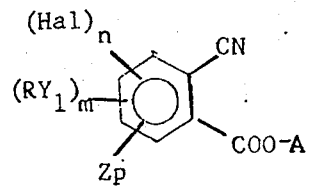

wherein A denotes an alkyl or aralkyl group, Hal denotes a chlorine or bromine atom, $Y_1$ denotes an oxygen or sulphur atom or a $SO_2$ group, R represents a hydrogen atom or an optionally substituted alkyl, cycloalkyl or aryl group if $Y_1$ denotes an oxygen or sulphur atom, and R represents an optionally substituted alkyl, cycloalkyl or aryl group if $Y_1$ denotes a $SO_2$ group, Z denotes a hydrogen atom, n denotes the number 0 to 3, m denotes the number 1 to 4 and p denotes the number 0 to 2, and the sum of m+n+p must not exceed 4, are novel and useful intermediates for dyestuffs. They are obtained in that a halogenocyanobenzoic acid derivative of the formula

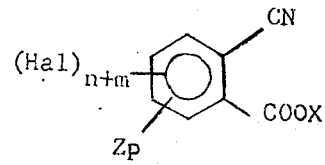

wherein X denotes an ammonium, alkyl or aralkyl group and the remaining symbols have the abovementioned meaning, is reacted in a hydrophilic organic solvent with a compound of the formula RYMe, wherein Me denotes an alkali metal atom and R and Y have the abovementioned meaning and, if X denotes an ammonium group, the resulting reaction product is esterified.

5 Claims, No Drawings

PROCESS FOR THE MANUFACTURE OF SUBSTITUTED O-CYANOBENZOIC ACID ESTERS

It has been found that substituted o-cyanobenzoic acid esters of the formula

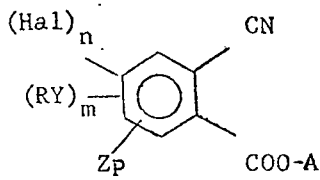

wherein A denotes an alkyl or aralkyl group, Hal denotes a chlorine or bromine atom, Y denotes an O or S atom, R denotes a hydrogen atom, an alkyl group which is optionally substituted, for example by alkoxy, aryloxy, cycloalkyl, aryl, alkoxycarbonyl or heterocyclic radicals, a cycloalkyl group, for example a cyclohexyl group, or an aryl group, preferably a phenyl radical which is optionally substituted by halogen atoms, nitro groups, amino, acetylamino or trifluoromethyl groups or alkyl or alkoxy groups with 1 to 8 carbon atoms, or a heterocyclic radical, for example a furane, thiophene or pyridine radical, Z denotes a hydrogen atom, $m$ denotes the number 1 to 4, $n$ denotes the number 0 to 3 and p denotes the number 0 to 2, with the sum of $m+n+p$ being at most 4, are obtained if a halogeno-cyanobenzoic acid derivative of the formula

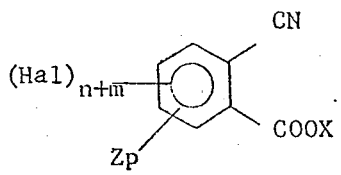

wherein X denotes an ammonium, alkyl or aralkyl group and the remaining symbols have the meaning indicated above, is reacted, in a hydrophilic organic solvent, with a compound of the formula RYMe, wherein Me denotes an alkali metal atom and R and Y have the abovementioned meaning and, if X denotes an ammonium group, the resulting reaction product is esterified.

The starting substances used are preferably tetrachlorobenzonitriles of the formula

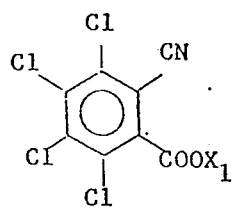

wherein $X_1$ denotes an alkyl group with 1 – 10 carbon atoms or an ammonium group.

The ammonium salts of 3,4,5,6-tetrachloro-2-cyanobenzoic acid was preferentially suitable for the reaction with alkali metal alcoholates, alkali metal phenolates or alkali metal mercaptides and the alkyl esters are especially suitable for the reaction with the alkali metal salts of the mercaptans or phenols.

The following halogeno-cyano-benzoic acid derivatives may be mentioned as examples: 3,4,5,6-tetrachloro-2-cyanobenzoic acid methyl ester, 3,4,5,6-tetrachloro-2-cyanobenzoic acid ethyl ester, 3,4,5,6-tetrachloro-2-cyanobenzoic acid isopropyl ester, 3,4,5,6-tetrachloro-2-cyanobenzoic acid butul ester, 3,4,5,6-tetrachloro-2-cyanobenzoic acid benzyl ester, 3,4,5,6-tetrabromo-2-cyanobenzoic acid methyl ester, 3,6-dichloro-2-cyanobenzoic acid methyl ester as well as the ammonium salts of 3,4,5,6-tetrachloro-2-cyanobenzoic acid, 3,4,5,6-tetrabromo-2-cyanobenzoic acid and 3,6-dichlorocyanobenzoic acid. These halogeno-cyano-benzoic acid derivatives are known compounds.

Preferentially used compounds of the formula RYMe are the alkali metal salts of aliphatic alcohols, especially those wherein the alkyl radical has 1 to 10 carbon atoms and which can be substituted yet further, for example of methanol, ethanol, propanol, isopropanol, butanol, isobutanol, lauryl alcohol, cetyl alcohol, β-methoxyethanol, β-ethoxyethanol, β-phenoxyethanol, γ-phenoxypropanol, benzyl alcohol, phenylethyl alcohol, β-cyclohexylpropanol, glycollic acid methyl ester, furfuryl alcohol or tetrahydrofurfuryl alcohol.

Amongst the aromatic series, the alkali metal salts of the following phenols may be mentioned: phenol, 2-, 3- or 4-chlorophenol, 2,4-dichlorophenol, 4-bromophenol, 2-, 3- or 4-methylphenol, 4-tert.butylphenol, 4-tert.amylphenol, 2,4-dimethylphenol, 2,6-dimethylphenol, 2-, 3- or 4-methoxyphenol, 2- or 4-nitrophenol, 3-trifluoromethylphenol, 3- or 4-aminophenol, 3- or 4-acetaminophenol, 3- or 4-hydroxybenzonitrile, -hydroxybenzoic acid esters or -hydroxyacetophenone, 4-phenylphenol, 2-naphthol or 5,6,7,8-tetrahydro-2-naphthol, 3-hydroxypyridine, 8-hydroxyquino-line and 5- and 6-hydroxybenztriazole.

As examples of sulphur-containing compounds of the formula RYMe there may be mentioned the alkali salts of -mercaptobenzoxazole sulphide and especially of the alkylmercaptans with 1 to 10 carbon atoms, namely of methylmercaptan, ethylmercaptan, isopropylmercaptan, butylmercaptan or thioglycollic acid methyl ester and preferably the alkali metal salts of phenylmercaptan and its derivatives which are substituted in the phenyl radical, for example by halogen atoms or alkyl or alkoxy groups containing 1 to 4 carbon atoms, and of naphthylmercaptan, such as, for example, phenylmercaptan, 2-, 3- or 4-chlorophenylmercaptan, 2,4-dichlorophenylmercaptan, 2- 3- or 4-methylphenylmercaptan, 2,4-dimethylphenylmercaptan or 2-naphthylmercaptan, 2-mercaptobenzthiazole, 2-mercaptobenzoxaxole and 2-mercaptobenzimidazole.

The reaction takes place in a hydrophilic, preferably polar, organic solvent, for example an alcohol, such as methanol, ethanol, isopropanol, β-methoxy- or β-ethoxyethanol, a ketone, such as acetone or methyl ethyl ketone, an ether, such as tetrahydrofurane or dioxane, an amide, such as dimethylformamide, dimethylacetamide, N-methylpyrrolidone or tetramethylurea, a sulphone, such as tetramethylenesulphone, a sulphoxide, such as dimethylsulphoxide, or a tertiary base, such as pyridine.

Mixtures of the solvents mentioned can also be used.

Advantageously, at least 1 part by volume of the solvent is used per 1 part by weight of the halogenobenzonitrile.

Depending on the amount of the compound RYMe, 1 to 4 halogen atoms can be replaced. If $X_1$ denotes an ammonium group it is advantageous to employ 2 mols of the compound ROMe for replacing the first halogen atom and at least 3 mols of ROMe for replacing 2 halogen atoms. If $X_1$ denotes an alkyl group, the equimolar amounts suffice, that is to say 1 mol of RYMe for one halogen atom to be replaced. In this way, it proves possible to obtain chemically pure compounds in good yields. For example, the reaction can be so controlled by selecting the amount of the compound RYMe that the isomer-free monosubstituted product is produced practically exclusively. It is possible to demonstrate by degradation reactions that the —YR group is in the 5-position. The present process thus permits a stepwise replacement of the halogen atoms. It is possible to manufacture the isomer-free mono-, di- and tetra-substitution products. It is surprising that the reaction takes place so nearly as a single reaction, if it is borne in mind that the halogeno-cyano-benzoic acid esters very easily cyclise to isoindolinone derivatives, compare, for example, French Patent Specification No. 1,216,621. It was not to be expected that with alkali metal phenolates and with arylmercaptides the replacement of chlorine would take place more rapidly than the cyclisation. With alkali metal alcoholates, the cyclisation to the 3,3-dialkoxyisoindolinone takes place quantitatively under the same conditions.

In the case of the ammonium salts of the halogenocyanobenzoic acids the smooth replacement of halogen atoms by the radicals RY is again surprising in view of the ease of decarboxylation of the ammonium salts of the tetrahalogeno-o-cyanobenzoic acid (see Swiss Patent Application No. 16,793/70).

As a rule, the reaction takes place without external application of heat. However it may prove desirable to warm the reaction mixture to complete the reaction. The resulting reaction product can easily be isolated by evaporating the solvent.

Instead of starting from the alkali metal phenolates it is also possible only to form these during the reaction by adding alkali metal carbonates to the reaction mixture consisting of the tetrachlorocyanobenzoic acid ester and the phenol.

When starting from an ammonium salt of halogeno-cyano-benzoic acid an esterification following the halogen replacement is necessary. This is preferably carried out in a mixture of hydrophilic organic solvent and aqueous alkali by means of a dialkyl sulphate, especially dimethyl sulphate, the aqueous alkali preferably containing one of the abovementioned hydrophilic organic solvents.

Those of the compounds obtained according to the process which contain an alkylmercapto or arylmercapto group can be converted into the corresponding sulphones in accordance with known processes by treatment with an oxidising agent, for example hydrogen peroxide.

The compounds obtained according to the process are all new and represent valuable intermediate products, for example for the manufacture of dyestuffs of the isoindolinone series, such as are described, for example, in German Patent Specification Nos. 1,098,126 or 1,569,773. For this purpose, they can be used directly or converted into the cyclised isoindolinone intermediate products. For example, treatment with $NH_3$ produces the 3-imino- and treatment with Na alcoholates produces the 3,3-dialkoxyisoindolin-1-ones.

In the examples which follow the percentages denote percentages by weight.

EXAMPLE 1

18.8 g of phenol and 35.3 g of a 30.6 percent strength solution of sodium methylate in methanol are reacted in 100 ml of dimethylsulphoxide to give sodium phenolate. The methanol is distilled off and 30.2 g of the ammonium salt of 3,4,5,6-tetrachloro-2-cyanobenzoic acid are introduced at room temperature, whilst stirring. The entire reaction mixture is now additionally warmed to 60° – 70°C for 1 hour and is then completely evaporated to dryness in vacuo.

Esterification: The evaporation residue is dissolved in 100 ml of water and 150 ml of acetone, 42 g of sodium bicarbonate are added and 51.5 ml of diethyl sulphate are now added dropwise whilst stirring. Thereafter the mixture is stirred for 1 hour at room temperature and then for 2 hours at 50°C. For working up, the batch is poured into 1 l of water and extracted with chloroform. The chloroform layer is dried with sodium sulphate and evaporated. An oil remains, which can be crystallised from methanol. 3,4,6-Trichloro-5-phenoxy-2-cyanobenzoic acid ethyl ester, having a melting point of 88° – 89°C, is thus obtained. It serves as an intermediate product for the corresponding iminoisoindolinone, which is obtained as follows:

Manufacture of an intermediate product for isoindolinone pigments: 14.2 g of 3,4,6-trichloro-5-phenoxy-2-cyanobenzoic acid ethyl ester are dissolved in 60 ml of dioxane and 50 ml of methanol. 40 ml of concentrated ammonia are now added, the mixture is stirred for 24 hours at room temperture and a further 40 ml of concentrated ammonia are added. After a further 24 hours the product which has precipitated is filtered off and dried. 6.7 g of crude product of decomposition point 288° – 292°C and corresponding to the formula

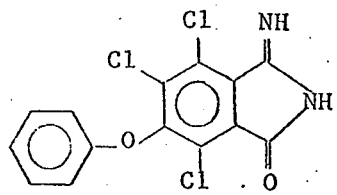

are thus obtained.

EXAMPLE 2

30.2 g of ammonium salt of 3,4,5,6-tetrachloro-2-cyanobenzoic acid are introduced into a solution of 10.8 g of sodium methylate in 32 ml of melthanol and 100 ml of dimethylformamide whilst stirring. After the slightly exothermic reaction has subsided, the mixture is stirred for a further 15 hours at room temperature.

Esterification: The reaction mixture is diluted with 80 ml of water and the pH value is then adjusted to 8 – 9 by adding sulphuric acid. 42 g of sodium bicarbonate are now added and thereafter 63 g of dimethyl sulphate are added dropwise. After the addition is complete, the reaction mixture is stirred for 30 minutes at room temperature, briefly warmed to 80°C and then introduced into a mixture of 1 l of water and 40 ml of concentrated ammonia. The reaction product which has precipitated is filtered off and dried. 24 g of crude 3,4,6-trichloro-5-methoxy-2-cyanobenzoic acid methyl ester are thus obtained, having a melting point of 100°C after recrystallisation from methanol. The substance serves as an intermediate product for the corresponding isoindolinone, which is obtained as follows: 14.7 g of 3,4,6-trichloro-5-methoxy-2-cyanobenzoic acid methyl ester are introduced into a solution of 2.75 g of Na methylate in 80 ml of methanol. The solution is stirred for 3 hours at room temperature and is then poured into 500 ml of water containing 25 ml of acetic acid. The precipitate is filtered off and dried. 15 g of 3,3,6-trimethoxy- 4,5,7-trichloroisoindolinone of decomposition point 138° to 140°C are obtained.

EXAMPLES 3 – 9

If, in the preceding example, the sodium methylate is replaced by 4.8 g of sodium and the methanol is replaced by 100 ml of an alcohol ROH listed in column 6 of Table A which follows, and the same procedure is adopted, compounds of the general formula I are obtained. Column 3 gives the melting points of the recrystallised products and column 5 the solvents for the recrystallisation.

EXAMPLE 11

30.2 g of the ammonium salt of 3,4,5,6-tetrachloro-2-cyanobenzoic acid are introduced whilst stirring into a solution of 43.2 g of sodium methylate in 125 ml of methanol and 100 ml of dimethylformamide. After 30 minutes the mixture is heated under reflux for 2 hours. Thereafter the entire reaction mixture is evaporated to dryness in vacuo.

Esterification: The residue is dissolved by means of 100 ml of water and 200 ml of acetone, 42 g of sodium bicarbonate are added and thereafter 63 g of dimethyl sulphate are added dropwise. After completion of the addition, the mixture is stirred for 1 hour at room temperature, then warmed to 50°C for 1 hour and thereafter poured out into 1 l of water and 40 ml of concentrated ammonia. The reaction product which has precipitated is filtered off and dried. 21 g of 4,6-dichloro-3,5-dimethoxy-2-cyanobenzoic acid methyl ester are thus obtained, having a melting point of 93°C after recrystallisation from methanol.

Further compounds of the general formula II can be manufactured in accordance with the instructions of this example. If R is an aliphatic radical the sodium

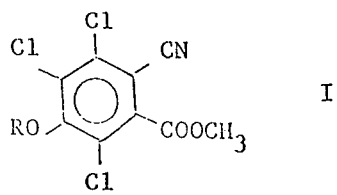

I

Table A

| No. | R | Melting point | Boiling point | Recrystallised from | ROH |
|---|---|---|---|---|---|
| 3 | —$C_2H_5$ | 89–90°C | | Alcohol | $C_2H_5OH$ |
| 4 | —$CH(CH_3)_2$ | liquid | | | $(CH_3)CHOH$ |
| 5 | —$C_3H_7$ | liquid | 140–3°C/0.15 mm | | $C_3H_7OH$ |
| 6 | —$C_4H_9$ | 58°C | | Isopropanol | $C_4H_9OH$ |
| 6 | —$c_2H_4OCH_3$ | 74°C | | Alcohol | $CH_3OC_2H_5OH$ |
| 8 | —$C_2H_4OC_2H_5$ | liquid | | | $C_2H_5OC_2H_4OH$ |
| 9 | —$CH_2$—Ph | 119–120°C | | Butanol | Ph—$CH_2OH$ |

EXAMPLE 10

If in Example 2, in place of the ammonium salt of 3,4,5,6-tetrachloro-cyanobenzoic acid, the ammonium salt of 3,4,5,6-tetrabromo-cyanobenzoic acid is used and the same procedure is followed, 3,4,6-tribromo-5-methoxy-2-cyanobenzoic acid methyl ester is obtained, which has a melting point of 149° – 150°C after recrystallisation from butanol.

methylate in this example is replaced by 9.2 g of sodium and the methanol by 100 ml of an alcohol ROH listed in Table B.

If R is an aromatic radical, no methanol is used and instead of the sodium methylate the amounts of phenolate or chlorophenolate indicated under the column NaOR in Table B are used.

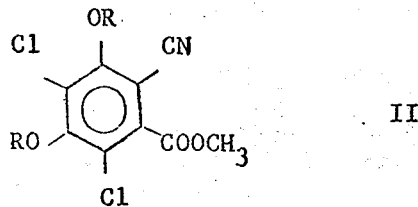

II

Table B

| Example | R | Melting point | Recrystallised from | ROH | NaOR in g |
|---|---|---|---|---|---|
| 12 | $-C_2H_5$ | liquid | | $C_2H_5OH$ | |
| 13 | $-C_2H_4OCH_3$ | liquid | | $CH_3OC_2H_5OH$ | |
| 14 | $-\langle\bigcirc\rangle$ | 117–118°C | $CH_3OH$ | – | 46.4 |
| 15 | $-\langle\bigcirc\rangle-Cl$ | 178–180°C | $C_4H_9OH$ | – | 64.2 |

EXAMPLE 16

Whilst following the instructions of Example 2, 10 g of methylmercaptan are additionally introduced before adding the ammonium salt of 3,4,5,6-tetrachloro-o-cyanobenzoic acid.

After the esterification, 28.2 g of crude product are obtained, consisting of a mixture of 3,4,6-trichloro-5-methylmercapto-o-cyanobenzoic acid methyl ester and 4,6-dichloro-3,5-bis-(methylmercapto)-2-cyanobenzoic acid methyl ester.

EXAMPLES 17 – 24

Pure compounds of the general formulae III and IV are obtained if the amounts indicated in Table C are used.

Column 5 indicates the amount of sodium methylate, column 6 the amount of mercaptan and column 7 the amount of methanol.

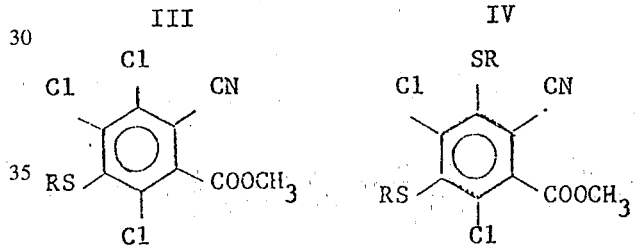

Example 17 to 22 correspond to the formula III.
Example 23 and 24 correspond to the formula IV.

Table C

| Example | R | Melting point | Recrystallised from | NaOCH$_3$ in g | RSH in g | CH$_3$OH in ml |
|---|---|---|---|---|---|---|
| 17 | $-CH_3$ | 109–110°C | Butanol | 5.65 | 5.05 | 15 |
| 18 | $-C_2H_5$ | 63–64°C | Ethanol | 5.65 | 6.7 | 15 |
| 19 | $-CH_2-\langle\!\!\stackrel{O}{\bigcirc}\!\!\rangle$ | liquid | | 5.65 | 12.3 | 15 |
| 20 | $-CH_2COOCH_3$ | 58–59°C | Methanol | 5.65 | 11.5 | 15 |
| 21 | $-C_3H_6-\langle H \rangle$ | liquid | | 5.65 | 17.1 | 15 |
| 22 | $-C_3H_6O-\langle\bigcirc\rangle$ | liquid | | 5.65 | 18.2 | 15 |
| 23 | $-CH_3$ | 134–35°C | Butanol | 16.6 | 15.4 | 50 |
| 24 | $-CCH_5$ | 84–88°C | Ethanol | 16.6 | 25 | 50 |

The iminoisoindolinone can be manufactured as follows: 31 g of the product from Example 17 are treated with 100 ml of liquid ammonia in a pressure vessel and the mixture is stirred for 40 hours at room temperature. After evaporating off the ammonia, 26.5 g of crude product of decomposition point 238° – 240°C are obtained, corresponding to the formula

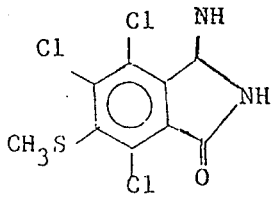

EXAMPLE 25

Hydrogen sulphide is introduced into a solution of 60 g of tetrachloro-o-cyanobenzoic acid methyl ester in 400 ml of pyridine and 30 ml of triethylamine whilst cooling at 2° – 8°C, until saturation is reached. After completion of the introduction, the batch is poured out into water and the mixture is rendered acid to Congo Red by means of hydrochloric acid. The whole is stirred for a further 2 hours and is then filtered. The moist crude product is directly recystallised from isopropanol. After two recrystallisations, 32 g of 3,4,6-trichloro-5-mercapto-2-cyanobenzoic acid methyl ester of melting point 100°C are obtained.

EXAMPLE 26

12.8 g of 2,6-dimethylphenol are reacted with 18 g of a 30.6 percent sodium methylate solution in 100 ml of chlorobenzene to give the phenolate. The solvent is distilled off and the solid dimethyl phenolate is taken up in 100 ml of acetone. 30 g of 3,4,5,6-tetrachloro-2-cyanobenzoic acid methyl ester are added without cooling and the mixture is stirred for 1 hour at room temperature and thereafter heated for 1 hour under reflux. The reaction mixture is poured into 1 l of water and extracted with chloroform, and the chloroform extract is evaporated. An oil remains, which is crystallised by means of methanol. 11.7 g of 3,4,6-trichloro-5-(2,6-dimethylphenoxy)-2-cyanobenzoic acid methyl ester having a melting point of 126° – 127°C are obtained.

EXAMPLES 27 – 35

The compounds of the general formula V described in Table D are manufactured according to instructions and the preceding example. Column 5 gives the amounts of the phenols ROH which are used instead of the 12.8 g of 2,6-dimethylphenol indicated in the example.

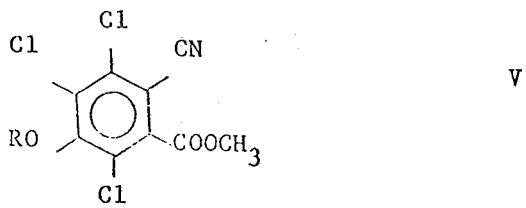

Table D

| Example | R | Melting point | Recrystallised from | Amount of ROH in g |
|---|---|---|---|---|
| 27 | –⌬ | 95– 96°C | Methanol | 11.3 |
| 28 | –⌬–Cl (Cl) | 113–114°C | " | 15.4 |
| 29 | –⌬–Cl | 139–140°C | " | 19.6 |
| 30 | –⌬–NO$_2$ | 142–143°C | " | 16.7 |
| 31 | –⌬ (CH$_3$) | 119–120°C | Isopropanol | 13 |
| 32 | –⌬–CH$_3$ | 93– 94°C | " | 13 |
| 33 | –⌬–OCH$_3$ | 111–113°C | Butanol | 13.2 |
| 34 | –⌬–CF$_3$ | 91– 92°C | " | 16.2 |
| 35 | –⌬⌬ | 134–140°C | Isopropanol | 14.4 |

EXAMPLE 36

500 ml of dimethylsulphoxide and 141 g of sodium p-chlorophenolate are initially introduced into the reaction vessel. 150 g of 3,4,5,6-tetrachloro-o-cyanobenzoic acid methyl ester are introduced whilst stirring and the reaction mixture is subsequently heated to 50°C for 1 hour. For working up, the batch is poured out into 5 l of water and the precipitate is filtered off and dried. 240 g of crude product are obtained. After recrystallisation from butanol, the pure 4,6-dichloro-3,5-di(p-chlorophenoxy)-2-cyanobenzoic acid methyl ester is obtained, which has a melting point of 178° – 180°C.

EXAMPLES 37 – 42

If, in the preceding example, the sodium p-chlorophenolate is replaced by the sodium salts of phenol, p-cresol, m-cresol, o-cresol, p-methoxyphenol or o-chlorophenol and the same procedure is followed, the corresponding 4,6-dichloro-3,5-diphenoxy-2-cyanobenzoic acid methyl esters are obtained.

EXAMPLE 43

43.3 g of p-chlorothiophenol are dissolved by means of sodium hydroxide solution in water and a little alcohol. The pH value is adjusted to 8 – 9 by adding acetic acid. The turbid solution thus obtained is run, with good stirring, into a boiling mixture of 92 g of 3,4,5,6-tetrachloro-o-cyanobenzoic acid methyl ester and 800 ml of water. The mixture is heated for 10 hours under reflux and is then cooled, and the reaction product is extracted with chloroform. After evaporating the chloroform extract, a viscous oil remains, which can be recrystallised from methanol with addition of decolourising charcoal. 55 g of crystalline 3,4,6-trichloro-5(p-chlorophenyl-mercapto)-2-cyanobenzoic acid methyl ester having a melting point of 110° – 111°C are thus obtained.

10 g of the 3,4,6-trichloro-5-(p-chlorophenylthio)-2-cyanobenzoic acid methyl ester manufactured in this example are heated in 100 ml of acetic acid and 20 ml of 30 percent strength hydrogen peroxide to the boil for 1½ hours. The reaction product is filtered off at room temperature. 8.7 g of sulphone of melting point 183° – 186°C are obtained, of which the microanalysis agrees with the following formula:

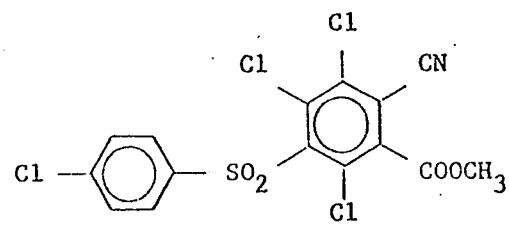

EXAMPLES 44 – 45

If, in the preceding example, the p-chlorothiophenol is replaced by the equivalent amount of thiophenol or p-methylthiophenol, the phenylmercapto- or p-methylphenylmercapto-trichloro- 2-cyanobenzoic acid methyl esters substituted in the 5-position are obtained.

EXAMPLE 46

90 g of 3,4,5,6-tetrachloro-2-cyanobenzoic acid methyl ester are introduced into a solution of 95.4 g of p-chlorothiophenol in 500 ml of acetone and 300 ml of 2n sodium hydroxide solution. The mixture is heated under reflux for 1 hour and is allowed to cool, and the precipitate is filtered off. After recrystallisation from glacial acetic acid 44 g of 4,6-dichloro-3,5-di-(p-chlorophenylmercapto)-2-cyanobenzoic acid methyl ester of melting point 139° – 140°C are obtained.

EXAMPLE 47 – 48

If, in the preceding example, the p-chlorothiophenol is replaced by the equivalent amount of thiophenol or p- or m-methylthiophenol, the corresponding 4,6-dichloro-3,5-diphenylmercapto-2-cyanobenzoic acid esters are obtained.

EXAMPLE 49

A solution of 73.3 g of a 30.6 percent strength solution of sodium methylate in methanol and 20 g of methylmercaptan is added dropwise to a solution of 30 g of 3,4,5,6-tetrachloro-2-cyanobenzoic acid methyl ester in 50 ml of dimethylformamide in such a way that the temperature gradually rises to 60° – 70°C as a result of the heat of reaction. After completion of the addition, the reaction mixture is further warmed to 70° – 80°C for 1 hour and is then poured into 1 l of water. The whole is extracted with chloroform. The oil which remains after distilling off the chloroform is caused to crystallise by adding alcohol. A further recrystallisation from butanol yields 15 g of the pure 3,4,5,6-tetramethylmercapto-2-cyanobenzoic acid methyl ester, melting at 70° – 71°C.

EXAMPLE 50

If, in the preceding example, the methylmercaptan is replaced by 46.3 g of thiophenol and exactly the same procedure is followed, 47 g of the pure 3,4,5,6-tetraphenylmercapto-2-cyanobenzoic acid methyl ester of melting point 160° – 161°C are obtained.

EXAMPLE 51

23 g of 3,6-dichloro-2-cyanobenzoic acid methyl ester and 50 ml of dimethylsulphoxide are initially introduced into the reaction vessel. A solution of 15.5 g of sodium p-chlorothiophenolate and 70 ml of dimethylsulphoxide is now added dropwise whilst stirring. In the course thereof the temperature rises to 40°C. After ½ hour, the mixture is poured out into water. An oil which solidifies completely after 1 – 3 hours separates out. It is filtered off, washed with water and recrystallised from isopropanol. 13.8 g of 6-chloro-3-phenylmercapto-2-cyanobenzoic acid methyl ester of melting point 86° – 87°C are obtained.

EXAMPLE 52

If, in the preceding example, the sodium thiophenolate is replaced by the sodium salt of o-cresol and the same procedure is followed, 6-chloro-3-(o-methylphenoxy)-2-cyanobenzoic acid methyl ester of melting point 89°C is obtained.

EXAMPLE 53

In the Example 27, instead of 3,4,5,6-tetrachloro-2-cyanobenzoic acid methyl ester, the equimolar amount of 3,4,5,6-tetrabromo-2-cyanobenzoic acid methyl ester is used and the same procedure is employed, 36 g of crude 3,4,6-tribromo-5-phenoxy-2-cyanobenzoic acid methyl ester are obtained. After recrystallisation from butanol, the pure compound has a melting point of 127° – 129°C.

EXAMPLE 54

A mixture of 10.9 g of p-aminophenol, 30 g of 3,4,5,-6-tetrachloro-2-cyanobenzoic acid methyl ester, 13.8 g of potassium carbonate and 100 ml of dimethylsulphoxide is stirred under a nitrogen atomsphere for 2 hours at room temperature and subsequently for 1 hour at 50°C. The cooled solution is poured into water and the reaction product is extracted with methylene chloride. The methylene chloride extract is washed with water, dried with sodium sulphate and filtered and the methylene chloride is evaporated off. The residue which has solidified is recrystallised from isopropanol. 20 g of 3,4-,6-trichloro-5-(p-aminophenoxy)-2-cyanobenzoic acid methyl ester are obtained, having a melting point of 160°–161°C.

EXAMPLES 55–58

If in the preceding example the p-aminophenol is replaced by equivalent amounts of m-aminophenol, p-acetaminophenol or m-acetaminophenol, the esters of the corresponding phenols are obtained.

What we claim is:

1. Process for the manufacture of substituted o-cyanobenzoic acid esters of the formula

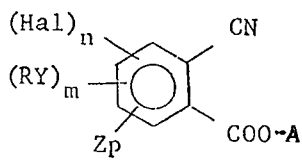

wherein A denotes an alkyl or aralkyl group, Hal denotes a chlorine or bromine atom, Y denotes an oxygen or sulphur atom, R denotes a hydrogen atom or an optionally substituted alkyl, cycloalkyl or aryl group, Z denotes a hydrogen atom, $n$ denotes the number 0 to 3, $m$ denotes the number 1 to 4 and p denotes the number 0 to 2, with the sum of $m+n+p$ being at most 4, characterised in that a halogenocyanobenzoic acid derivative of the formula

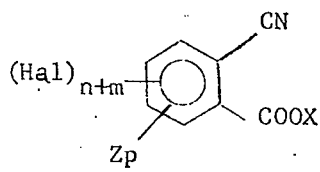

wherein X denotes an ammonium, alkyl or aralkyl group and the remaining symbols have the abovementioned meaning, is reacted in a hydrophilic organic solvent with a compound of the formula RYMe, wherein Me denotes an alkali metal atom and R and Y have the abovementioned meaning and, if X denotes an ammonium group, the resulting reaction product is esterified.

2. Process according to claim 1, characterised in that it starts from a compound of the formula

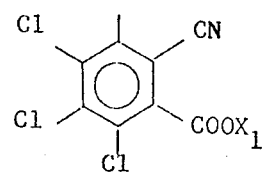

wherein $X_1$ denotes an alkyl, aralkyl or ammonium group.

3. Process according to claim 1, characterised in that a compound of the formula

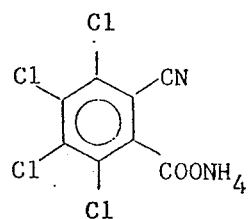

is reacted with an alkali metal salt of an aliphatic alcohol or alkylmercaptan, containing 1 to 10 carbon atoms, or an alkali metal salt of a phenol or phenylmercaptan, of which the phenyl radicals can be substituted by halogen atoms or alkyl or alkoxy groups containing 1 to 8 carbon atoms.

4. Process according to claim 1, characterised in that a compound of the formula

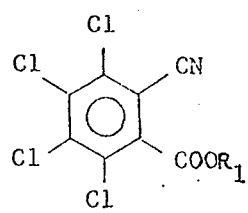

wherein $R_1$ denotes an alkyl group with 1 to 10 carbon atoms, is reacted with an alkali metal salt of an alkylmercaptan, containing 1 to 10 carbon atoms, or with the alkali metal salt of a phenol or phenylmercaptan, of which the phenyl radicals can be substituted by halogen atoms or alkyl or alkoxy groups containing 1 to 8 carbon atoms.

5. Process according to claim 1, characterised in that the esterification is carried out in aqueous alkali with a dialkyl sulphate.

* * * * *